(12) United States Patent
Adler et al.

(10) Patent No.: US 8,170,369 B2
(45) Date of Patent: May 1, 2012

(54) CORRELATION BETWEEN SETS OF DATA

(76) Inventors: Jeremy Adler, Stockholm (SE); Ingela Parmryd, Stockholm (SE)

( * ) Notice: Subject to any disclaimer, the term of this patent is extended or adjusted under 35 U.S.C. 154(b) by 172 days.

(21) Appl. No.: 12/312,863

(22) PCT Filed: Nov. 8, 2007

(86) PCT No.: PCT/EP2007/062060
§ 371 (c)(1),
(2), (4) Date: Mar. 9, 2010

(87) PCT Pub. No.: WO2008/064982
PCT Pub. Date: Jun. 5, 2008

(65) Prior Publication Data
US 2010/0220902 A1 Sep. 2, 2010

(30) Foreign Application Priority Data
Nov. 30, 2006 (SE) ...................................... 0602596

(51) Int. Cl.
*G06K 9/64* (2006.01)
(52) U.S. Cl. ........ 382/278; 382/294; 382/128; 382/129; 382/130; 382/131
(58) Field of Classification Search .................. 382/278, 382/294, 128–131
See application file for complete search history.

(56) References Cited

U.S. PATENT DOCUMENTS

| | | | | |
|---|---|---|---|---|
| 4,396,903 A | * | 8/1983 | Habicht et al. | 382/103 |
| 4,864,629 A | * | 9/1989 | Deering | 382/216 |
| 4,907,287 A | * | 3/1990 | Homma et al. | 382/255 |
| 5,761,333 A | * | 6/1998 | Hsieh et al. | 382/131 |
| 6,208,749 B1 | * | 3/2001 | Gutkowicz-Krusin et al. | 382/128 |

(Continued)

OTHER PUBLICATIONS

Noise—problem, Adler et al., TIB495117628998, 2009, pp. 7-10.*

(Continued)

*Primary Examiner* — Jayesh A Patel
(74) *Attorney, Agent, or Firm* — Nixon & Vanderhye PC

(57) ABSTRACT

The present invention relates to a method to perform an accurate correlation between a first set of data (1), collected from a first source (A1), and a second set of data (2), collected from a second source (A2), in the presence of noise in one or both of the first and second sets of data (1, 2). The present invention specifically teaches that a third set of data (3) is collected from the first source (A1) under the same conditions as the conditions of the collection of the first set of data (1), and that a fourth set of data (4) is collected from the second source (A2) under the same conditions as the conditions of the collection of the second set of data (2). A measured correlation value (rm) between data collected from the first source (A1) and the second source (A2) is taken as one of the correlation measurements out of the possible combinations of the first and second set of data (r12), the first and fourth set of data (r14), the third and second set of data (r32) and the third and fourth set of data (r34). A correction value (C12) is calculated based on a correlation measurement between the first and third set of data (r13) and a correlation measurement between the second and fourth set of data (r24) according to the expression: (Formula (I)). This correction value (C12) is applied to the measured correlation value (rm) resulting in a corrected correlation value rc=rm×C12.

$$C12 = \frac{1}{\sqrt{r13 \times r24}} \quad \text{(I)}$$

8 Claims, 2 Drawing Sheets

U.S. PATENT DOCUMENTS

| | | | | |
|---|---|---|---|---|
| 6,310,967 | B1 * | 10/2001 | Heine et al. | 382/128 |
| 6,803,997 | B2 * | 10/2004 | Stanek | 356/2 |
| 7,010,159 | B2 * | 3/2006 | Ali | 382/155 |
| 7,529,426 | B2 * | 5/2009 | Neuman | 382/278 |
| 8,060,348 | B2 * | 11/2011 | Cline et al. | 703/2 |
| 2002/0071614 | A1 * | 6/2002 | Ali et al. | 382/278 |
| 2003/0026588 | A1 * | 2/2003 | Elder et al. | 386/46 |
| 2003/0169945 | A1 * | 9/2003 | Stanek | 382/293 |
| 2004/0071367 | A1 * | 4/2004 | Irani et al. | 382/284 |
| 2004/0190633 | A1 * | 9/2004 | Ali et al. | 375/240.29 |
| 2005/0002543 | A1 * | 1/2005 | Cornog et al. | 382/100 |
| 2005/0271297 | A1 * | 12/2005 | Zbilut et al. | 382/278 |
| 2007/0081741 | A1 * | 4/2007 | Diggins et al. | 382/278 |

OTHER PUBLICATIONS

On the—Colocalization, Adler et al., XP-002522541,2000, p. 1.*

Making—noise., Parmryd et al., XP-002522545,2007, pp. 1-2.*

Replicate—colocalization., Adler et al., XP-002522548, 2007, pp. 121-133.*

Multi-image—significance, Fletcher et al., 0006-3495, 1996, pp. 1996-2005.*

Measurement—images, Manders et al., TRMS vol. 169, Parch 1993, pp. 375-380.*

International Search Report for PCT/EP2007/062060, mailed May 15, 2009.

Adler et al., "Noise and Colocalisation in Fluorescence Microscopy: Solving a Problem", Microscopy and Analysis, vol. 22, No. 5, Sep. 1, 2008, pp. 7-10, XP008104429.

Yule et al., "An Introduction to the Theory of Statistics", 1958, Charles Griffin & Company Limited, London, pp. 253-280, 313-315, and 326-328, XP002522549.

Adler et al., "Replicate-based Noise Corrected Correlation for Accurate Measurements of Colocalization", Journal of Microscopy, vol. 230, No. 1, Apr. 2008, pp. 121-133, XP002522548.

Flotte et al., "A Computerized Image Analysis Method for Measuring Elastic Tissue", The Journal of Investigative Dermatology, vol. 93, No. 3, Sep. 1989, pp. 358-362, XP002522543.

Spearman, "The Proof and Measurement of Association Between Two Things", American Journal of Psychology, vol. 15, Jan. 1, 1904, pp. 72-101, XP008104419.

Anonymous, "Entry 'Disattenuation', Jul. 2, 2006", Wikipedia, [Online], 2 pages, XP002522542.

Adler et al., "Replicate Based Noise Corrected Correlation (RBNCC) for Accurate Measurements of Colocalization—The $7^{th}$ International ELMI Meeting on Advanced Light Microscopy, York, UK, Apr. 2007", Record of On-line Publication Documentation System for Stockholm University, [Online], Dec. 19, 2007, 2 pages, XP002522547.

Adler et al., "Making Accurate Measurement of Colocalization by Correcting for Image Noise" Online Supplement of Biophysical Journal—Abstract of Presentation at the $51^{st}$ Biophysical Society Annual Meeting, Mar. 3-7, 2007, Baltimore, MD, USA, XP002522545.

Adler et al., "Replicate Based Noise Corrected Correlation (RBNCC) for Accurate Measurements of Colocalization—The Nordic Confocal and Advanced Microscopy Meeting, Fiskebackskil, Sweden, Mar. 2007", Record of On-Line Publication Documentation System for Stockholm University, [Online], Dec. 19, 2007, XP002522546.

Adler et al., "Making Accurate Measurement of Colocalization by Correcting for Image Noise—The $51^{st}$ Biophysical Society Annual Meeting in Baltimore, MD, USA, Mar. 2007", Record of On-Line Publication Documentation System for Stockholm University, [Online], Dec. 19, 2007, XP002522544.

Adler et al., "On the Quantification and Representation of Colocalisation", Focus on Microscopy, Apr. 13-16, 2003, Genova, Italy, 2003, XP002522541.

Written Opinion of the International Searching Authority for PCT/EP2007/062060, mailed May 15, 2009.

* cited by examiner $$C12 = \frac{1}{\sqrt{r13 \times r24}} \quad (I)$$

CORRELATION BETWEEN SETS OF DATA

This application is the U.S. national phase of International Application No. PCT/EP2007/062060, filed 8 Nov. 2007, which designated the U.S. and claims priority to Swedish Application No. 0602596-9, filed 30 Nov 2006, the entire contents of each of which are hereby incorporated by reference.

FIELD OF INVENTION

The present invention relates to a method to perform an accurate correlation between a first set of data, collected from a first source, and a second set of data, collected from a second source, in the presence of noise in one or both said first and second sets of data. The present invention also relates to a computer program product and a computer readable medium through which the inventive method can be realised.

BACKGROUND ART

It is known that when noise is present the measured correlation between two sets of data is incorrect, the degree of inaccuracy relating to the amount of noise. In order to reduce the amount of noise in data collection, such as in image collection in microscopy, it is known to extend the acquisition time, bin adjacent pixels or sum replicate images. Pixels in an image that are binned to form a new image, if a 1 to 4 binning is used the final image has only 25% of the original pixels.

FIG. 1 shows a diagram where it is shown that as the number of images that are averaged increases the measured correlation value r rises and approaches the known value 1.00. However the approach to the known value is asymptotic and it is difficult to acquire data of sufficient quality to accurately and precisely measure correlation.

When the data sets are images and the sources for instance are different channels in a microscope system, where each channel for instance uses light of different wavelengths, it is known to make correlation measurements in the form of colocalization measurements between the two source images. If there is any noise in such images, then a correlation or colocalization measurement will not fully recognise a perfect match between two images of the same specimen, even if two images collected from the same source and with the same specimen where used, a true match would not be recognised if there is some kind of noise or distortion in the collected data.

This is true for all sets of data where it is possible to acquire a replicate set of data, such that each entry in the replicate set of data is a second measurement of the same piece of data in the original data. Whenever there is noise in the process of collecting or acquiring the set of data or any other kind of distortion, the two images will never result in a perfect match in a correlation measurement.

It is also known that there are different ways of measuring the correlation between two sets of data. One known way is the Spearman rank correlation and another is the Pearson correlation. The accuracy of both of these known ways is dependent on the noise in the input data.

SUMMARY OF THE INVENTION

Problems

In relation to the field of invention and the background art it is a problem to minimise the effect of noise in the process of making correlation measurements between two sets of data.

It is a problem to collect high quality data fast enough if the conditions are changing during the data collection, such as in the process of acquiring an image on biological material that changes over time.

It is also a problem to perform accurate correlation measurements on imperfect data sets.

These problems are all present when correlation is used to measure the colocalization between digital images of cells or biological specimens that show the distribution of fluorescent materials. References to colocalization are common in scientific papers covering the biology of cells and tissues.

Solutions

From the standpoint of the field of the invention, as described above, one or more of the above mentioned problems are solved by the inventive method by collecting a third set of data from the first source under the same conditions as the conditions of the collection of the first set of data, and by collecting a fourth set of data from the second source under the same conditions as the conditions of the collection of the second set of data.

The present invention teaches that a measured correlation value rm between data collected from the first source and the second source is taken as one of the correlation measurements out of the possible combinations of the first and second set of data r12, the first and fourth set of data r14, the third and second set of data r32 and the third and fourth set of data r34. A correction value C12 is calculated based on a correlation measurement between the first and third set of data r13 and a correlation measurement between the second and fourth set of data r24 according to the following expression:

$$C12 = \frac{1}{\sqrt{r13 \times r24}}$$

This correction value C12 is then applied to the measured correlation value rm resulting in a corrected correlation value rc according to the expression rc=rm×C12.

The correction value is based on correlation measurements between sets of data that are replicates of each other, the third set of data being collected under the same conditions as the conditions of the first set of data from the same source just as the fourth set of data is collected under the same conditions as the conditions of the second set of data from the same source, which means that these correlation measurements really indicates the amount of noise in the sets of data, at least under the condition that the second sets of data are taken under identical or nearly identical conditions. This also means that the correction value C12 can be used as a correction of the noise in the sets of data, as shown in the expression of the corrected correlation value rc.

Thus the present invention teaches that if each entry in the first set of data is a first measurement or collection of original data from the first source, then each entry in the third set of data is a second collection or measurement of the same original data from the first source, and that if each entry in the second set of data is a first measurement or collection of original data from the second source, then each entry in the fourth set of data is a second collection or measurement of the same original data from the second source.

With the purpose of even further increasing the accuracy of the correlation measurements between the data sets it is proposed that the measured correlation value rm is taken as the mean value of at least two of correlation measurements between the first and second set of data r12, the first and fourth set of data r14, the third and second set of data r32 and the third and fourth set of data r34. The highest accuracy is achieved by taking a mean value of all four measurements resulting from the four possible combinations of correlation measurements between data sets from the two sources.

Different methods for the correlation measurements can be used, and possible methods of correlation are the Spearman rank correlation and the Pearson correlation, which methods both can be used for the correlation measurements.

In a specific microscopy implementation of the present invention the first and second sources could be different channels in a microscope system, each channel using light of different wavelengths, and the first, second, third and fourth set of data would then be first, second, third and fourth source images collected from the microscope system. It is also possible that the 2 or 4 sets of data could be acquired concurrently Advantages The advantages of a method, computer program product or computer readable medium according to the present invention are that the present invention presents a possibility to make correct correlation measurements from poor data sets. The invention also provides way of making use of data collected too rapidly to be of sufficient quality for accurate correlation measurements. In the absence of correction proposed herein the collection of high quality date otherwise requires long acquisition times or the summing of replicate sets of data. Reducing the required quality of the data also means that images can be acquired more rapidly and therefore at a higher frequency, allowing faster events to be followed. Making accurate measurements from data that contains noise also makes it possible to use less highly specified and therefore cheaper detection equipment. These advantages are of particular importance in the microscopic examination of digital images of living cells or tissues and the measurement of correlation between fluorescent materials.

BRIEF DESCRIPTION OF THE DRAWINGS

A method, a computer program product and a computer readable medium according to the present invention will now be described in more detail with reference to the accompanying drawings, where.

DETAILED DESCRIPTION OF EMBODIMENTS AS PRESENTLY PREFERRED

Figure 1:
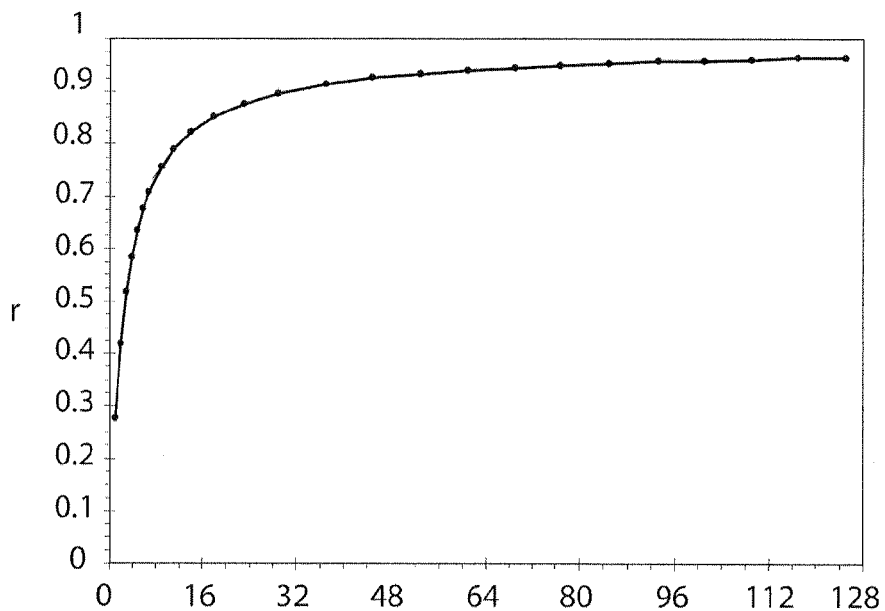
FIG. 1 shows a graph where a correlation value is rises and approaches the known value as the number of images averaged increases according to known technique, FIG. 2 schematically, and very simplified, illustrates the collection of sets of data from two sources and how these sets of data can be used according to the present invention.
Figure 2:
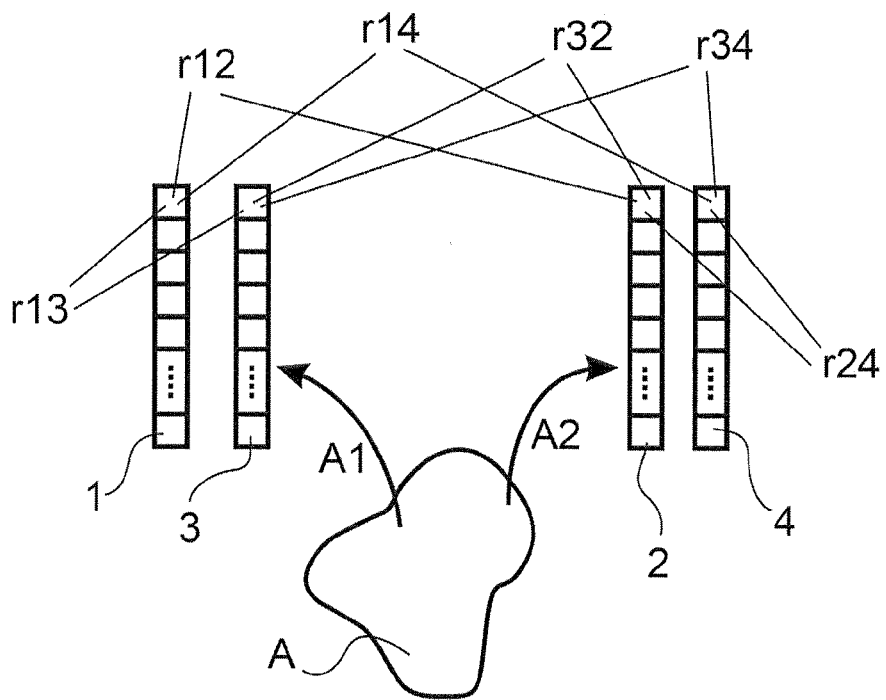

The present invention will now be described with reference to FIG. 2, schematically showing a first set of data 1, collected from a first source A1, and a second set of data 2, collected from a second source A2, in the presence of noise in one or both of the first and second sets of data 1, 2.

FIG. 2 is schematic and exemplifies the invention as an object A from which data is collected through two sources A1 and A2. A practical implementation of the invention is microscopy where the object A is an specimen to be examined, where the first source A1 could be a first channel through which data regarding the object is collected into a first image, and where the second source A2 could be a second channel through which data regarding the object A is collected into a second image. The two channels could for instance use different wavelengths of light and the object could also present different properties depending on the wavelength of the light from the microscope. Correlation between the two images would then represent a correlation between these different properties.

However, if there is noise in one or both of the two images, or sets of data 1, 2, a correlation measurement would not reflect the true correlation correctly but rather a too low correlation value due to the noise.

In order to compensate for the noise, or to measure a true correlation, even with short data acquisition times or poor sets of data, the present invention teaches that a third set of data 3 is collected from the first source A1 under the same conditions as the conditions of the collection of the first set of data 1, and that a fourth set of data 4 is collected from the second source A2 under the same conditions as the conditions of the collection of the second set of data 2.

If the conditions for the collection of data changes then one way of achieving the same conditions is to collect the third set of data directly after the first set of data and the fourth set of data directly after the second set of data. This will enable the possibility to collect data where the conditions for the collection of data is most likely still the same in the collection of data from respective source A1, A2, and the third and fourth sets of data 3, 4 can be considered as being copies of the first and second sets of data 1, 2 respectively.

The inventive method further teaches that a measured correlation value rm between data collected from the first source A1 and the second source A2 is taken as one of the correlation measurements out of the possible combinations of the first and second set of data 1, 2, resulting in the correlation value r12, the first and fourth set of data 1, 4, resulting in the correlation value r14, the third and second set of data 3, 2, resulting in the correlation value r32 and the third and fourth set of data 3, 4, resulting in the correlation value r34.

As a next step, the inventive method teaches a correlation measurement between the first and third set of data 1, 3, resulting in the correlation value r13, and a correlation measurement between the second and fourth set of data 2, 4 resulting in the correlation value r24. These two correlation measurements are calculated on sets of data where the real difference between the sets of data is due to noise, thus the resulting correlation values r13, r24 truly reflects the noise present in the respective sets of data.

A correction value C12 is calculated based on the correlation values r13 and r24 according to the following expression:

$$C12 = \frac{1}{\sqrt{r13 \times r24}}$$

The inventive method teaches that this calculated correction value C12 is applied to the measured correlation value rm resulting in a corrected correlation value rc according to the expression rc=rm×C12.

It should be noted that the present invention is not restricted to the above indicated expression and that other compensations also are possible. This means that the expression also could be rc=k×rm×C12, where k is a representation of any other compensation or correction that might be applied, such as small adjustments to the corrected value rc.

In order to achieve a good result through the inventive correction it is important that where each entry in the first set of data 1 is a first measurement or collection of original data from the first source A1, each entry in the third set of data 3 is a second collection or measurement of the same original data from the first source, thus making the third set of data 3 a copy of the first set of data 1, where the difference in these copies lies in the noise.

In the same way it is important that where each entry in the second set of data 2 is a first measurement or collection of original data from the second source A2, each entry in the fourth set of data 4 is a second collection or measurement of the same original data from the second source A2.

The present invention also teaches that since the invention provides four sets of data 1, 2, 3, 4, two from each source A1, A2, it is possible to measure a more correct measured correlation value rm than what is gained from only two sets of data. Thus the present invention teaches that it is possible to take the measured correlation value rm as the mean value of at least two of the possible combinations of correlation measurements between the first and second set of data 1, 2 resulting in the correlation value r12, the first and fourth set of data 1, 4 resulting in the correlation value r14, the third and second set of data 3, 2 resulting in the correlation value r32 and the third and fourth set of data 3, 4 resulting in the correlation value r34. It is for instance possible to take the measured correlation value rm as a mean value of all four available correlation values r12, r14, r32, r34.

Figure 3:
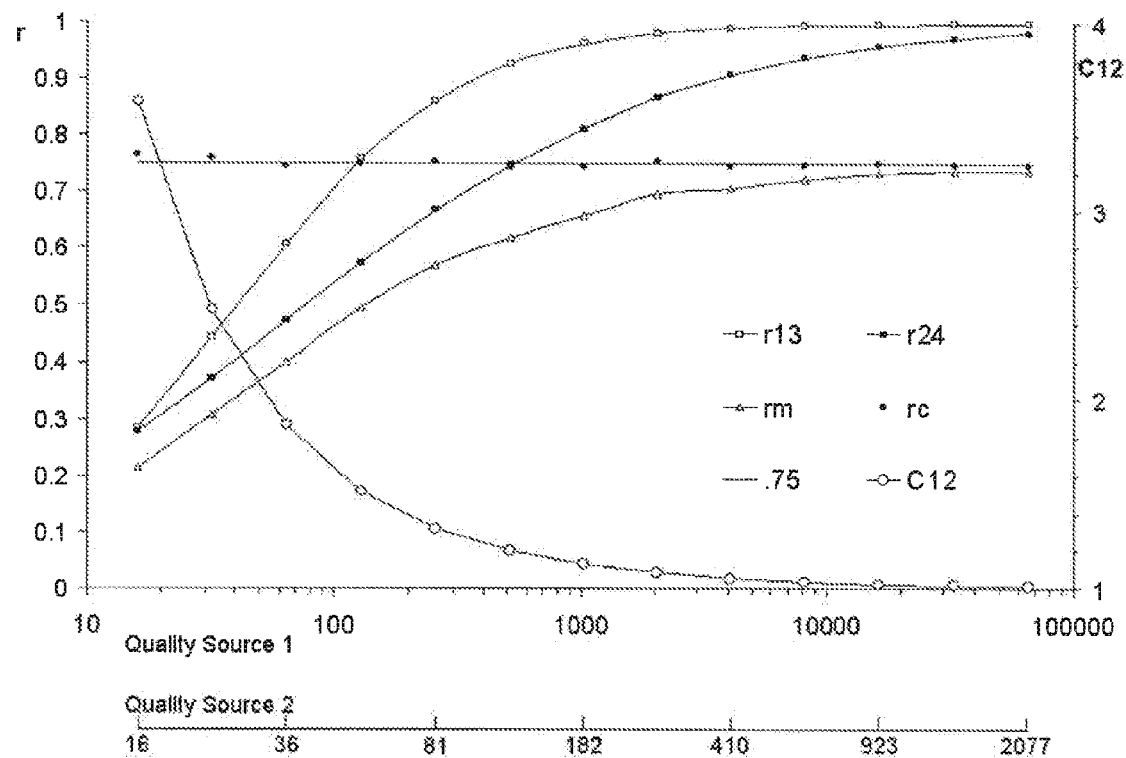
FIG. 3 shows a graph where a corrected correlation according to the present invention is indicated, FIG. 4 schematically illustrates an inventive computer program product, and FIG. 5 schematically illustrates a computer readable medium according to the present invention.

FIG. 3 shows a diagram illustrating the correction C12 applied to sets of data with Poisson noise. In the example shown in the diagram it is known that the correlation value between the sets of data coming from the first source A1 and the sets if data coming from the second source A2 is 0.75.

While the quality (quanta) of the first source A1 and the second source A2 are progressively increased, source A1 is doubled and source A2 is increased by 50%, and the figure shows that the correlation value for r13 and r24 is increasing accordingly. The measured correlation value rm between the first source A1 and the second source A2 approaches the known correlation value of 0.75 as the quality of the sources is increased, and it can also be seen that the inventive correction value C12 falls to nearly 1 as the quality of the first and second source A1, A2 is increased.

However, and most importantly, it can also be seen that when the correction value C12 is applied to the measured correction value rm the corrected value rc approaches the true correlation value 0.75 with even the poorest data.

In FIG. 3 Spearman rank correlation has been used for the correlation measurements, and a mean value from all four possible combinations of measured correlation values has been used as the measured correlation value rm.

It should be known that other methods, such as the Pearson correlation, can be used for the correlation measurements.

The present invention has been proven successful in a setting where the first and second sources A1, A2 are different channels in a microscope system, each channel using light of different wavelengths and where the first, second, third and fourth set of data are a first, second, third and fourth source images collected from the microscope system. The present invention can however be implemented in any application where noise is a problem in correlation measurements between different sets of data.

Figure 4:
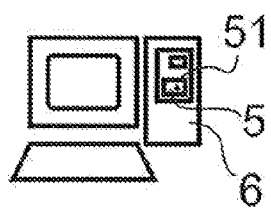

The present invention also relates to a computer program product 5 comprising computer program code 51, which, when executed by a computer 6, will enable the computer 6 to perform the inventive correlation of sets of data, as schematically illustrated in FIG. 4.

Figure 5:

FIG. 5 illustrates a computer readable medium 7 carrying inventive computer program code 51, the computer readable medium being schematically exemplified by a compact disc.

The invention is applicable to digitized images and digital data in general. It corrects for both the quality of the underlying signal and for additional noise introduced in detection and digitization. For example the method is applicable to microscopic images of fluorescent material from which relatively few photons may have been detected per pixel and which may also include noise from the detectors.

It will be understood that that the invention is not restricted to the aforedescribed and illustrated exemplifying embodiments thereof and that modifications can be made within the scope of the inventive concept as illustrated in the accompanying Claims.

The invention claimed is:

1. A method to perform an accurate correlation between a first set of data, collected from a first source, and a second set of data, collected from a second source, in the presence of noise in one or both of said first and second sets of data, where the data is data from digitized images, and where the noise is caused by the quality of the underlying signal and the detection and digitization of the signal, wherein a third set of data is collected from said first source under the same conditions as the conditions of the collection of said first set of data, a fourth set of data is collected from said second source under the same conditions as the conditions of the collection of said second set of data, a measured correlation value (rm) between data collected from said first source and said second source is taken as one of the correlation measurements out of the possible combinations of said first and second set of data (r12), said first and fourth set of data (r14), said third and second set of data (r32) and said third and fourth set of data (r34), a correction value (C12) is calculated based on a correlation measurement between said first and third set of data (r13) and a correlation measurement between said second and fourth set of data (r24) according to the following expression:

$$C12 = \frac{1}{\sqrt{r13 \times r24}}$$

and wherein said correction value (C12) is applied to said measured correlation value (rm) resulting in a corrected correlation value (rc) according to the expression rc=rm×C12.

2. A method according to claim 1, wherein each entry in said first set of data is a first measurement or collection of original data from said first source, each entry in said third set of data is a second collection or measurement of the same original data from said first source, each entry in said second set of data is a first measurement or collection of original data from said second source, and wherein each entry in said fourth set of data is a second collection or measurement of the same original data from said second source.

3. A method according to claim 1, wherein said measured correlation value (rm) is taken as the mean value of at least two of correlation measurements between said first and second set of data (r12), said first and fourth set of data (r14), said third and second set of data (r32) and said third and fourth set of data (r34).

4. A method according to claim 2, wherein said measured correlation value (rm) is taken as the mean value of at least two of correlation measurements between said first and second set of data (r12), said first and fourth set of data (r14), said third and second set of data (r32) and said third and fourth set of data (r34).

5. A method according to claim 1, wherein Spearman rank correlation is used for said correlation measurements.

6. A method according to claim 1, wherein Pearson correlation is used for said correlation measurements.

7. A method according to claim 1, wherein said first and second sources are different channels in a microscope system, each channel using light of different wavelengths and wherein said first, second, third and fourth set of data are a first, second, third and fourth source images collected from said microscope system.

8. A non-transitory computer readable medium encoded with a computer program code, which when executed by a computer, will enable said computer to perform an accurate correlation between a first set of data, collected from a first source, and a second set of data, collected from a second source, in the presence of noise in one or both of said first and second sets of data, where the data is data from digitized images, and where the noise is caused by the quality of the underlying signal and the detection and digitization of the signal, wherein—a third set of data is collected from said first source under the same conditions as the conditions of the collection of said first set of data, —a fourth set of data is collected from said second source under the same conditions as the conditions of the collection of said second set of data, —a measured correlation value (rm) between data collected from said first source and said second source is taken as one of the correlation measurements out of the possible combinations of said first and second set of data (r12), said first and fourth set of data (r14), said third and second set of data (r32) and said third and fourth set of data (r34), —a correction value (C12) is calculated based on a correlation measurement between said first and third set of data (r13) and a correlation measurement between said second and fourth set of data (r24) according to the following expression:

$$C12 = \frac{1}{\sqrt{r13 \times r24}}$$

and wherein—said correction value (C12) is applied to said measured correlation value (rm) resulting in a corrected correlation value (rc) according to the expression rc=rm×C12.

* * * * *